United States Patent
Tajima

(10) Patent No.: US 9,967,482 B2
(45) Date of Patent: May 8, 2018

(54) IMAGE PROCESSING APPARATUS, IMAGE PROCESSING METHOD, AND STORAGE MEDIUM FOR NOISE REDUCTION PROCESSING

(71) Applicant: CANON KABUSHIKI KAISHA, Tokyo (JP)

(72) Inventor: Chihiro Tajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/626,912

(22) Filed: Jun. 19, 2017

(65) Prior Publication Data
US 2017/0289472 A1 Oct. 5, 2017

Related U.S. Application Data

(62) Division of application No. 14/709,213, filed on May 11, 2015, now abandoned.

(30) Foreign Application Priority Data

May 14, 2014 (JP) .................................. 2014-100845

(51) Int. Cl.
G06K 9/00 (2006.01)
H04N 5/357 (2011.01)
(Continued)

(52) U.S. Cl.
CPC ............. *H04N 5/357* (2013.01); *G06T 5/002* (2013.01); *G06T 5/50* (2013.01); *H04N 5/361* (2013.01); *H04N 5/372* (2013.01); *H04N 5/374* (2013.01); *G06T 2207/20028* (2013.01); *G06T 2207/20076* (2013.01)

(58) Field of Classification Search
CPC . G06T 2207/20076; G06T 5/002; G06T 5/50; G06T 7/0085; G06T 5/20; G06T 2207/20012; H04N 5/372; H04N 5/374; H04N 1/58
See application file for complete search history.

(56) References Cited

U.S. PATENT DOCUMENTS 9,019,393 B2 * 4/2015 Jannard ................ H04N 5/3675
348/223.1
2008/0088857 A1 * 4/2008 Zimmer ................... H04N 1/56
358/1.6

(Continued)

*Primary Examiner* — Li Liu
(74) *Attorney, Agent, or Firm* — Canon U.S.A., Inc. IP Division

(57) ABSTRACT

An image processing apparatus to execute noise reduction processing on image data includes a setting unit, a determination unit, and an output unit. The setting unit sets a pixel group from among a plurality of pixel group candidates. The plurality of pixel group candidates includes at least a first pixel group having a plurality of pixels being a first number of pixels or a second pixel group having a plurality of pixels being a second number of pixels which is different from the first number of pixels. The determination unit determines, based on a similarity between a target pixel and a reference pixel that is obtained according to the set pixel group, a weight corresponding to the reference pixel. The output unit outputs a value, calculated based on a pixel value of the reference pixel and the weight, as a noise-reduced pixel value of the target pixel.

14 Claims, 18 Drawing Sheets

(51) Int. Cl.
   *H04N 5/361*    (2011.01)
   *G06T 5/00*     (2006.01)
   *H04N 5/374*    (2011.01)
   *G06T 5/50*     (2006.01)
   *H04N 5/372*    (2011.01)

(56) References Cited

U.S. PATENT DOCUMENTS

| | | | | |
|---|---|---|---|---|
| 2010/0013963 | A1* | 1/2010 | Jannard | H04N 5/3675 |
| | | | | 348/242 |
| 2010/0265367 | A1* | 10/2010 | Jannard | H04N 5/3675 |
| | | | | 348/242 |
| 2011/0052091 | A1* | 3/2011 | Zimmer | G06T 5/002 |
| | | | | 382/260 |
| 2011/0317045 | A1* | 12/2011 | Vakrat | G06T 5/002 |
| | | | | 348/242 |
| 2012/0121203 | A1* | 5/2012 | Hara | G06T 5/002 |
| | | | | 382/255 |
| 2012/0268623 | A1* | 10/2012 | Morel | G06T 5/50 |
| | | | | 348/229.1 |
| 2014/0240556 | A1* | 8/2014 | Yahata | G06K 9/40 |
| | | | | 348/241 |
| 2015/0287171 | A1* | 10/2015 | Hiasa | G06T 5/002 |
| | | | | 382/195 |
| 2015/0332440 | A1* | 11/2015 | Tajima | H04N 5/361 |
| | | | | 382/260 |
| 2017/0053385 | A1* | 2/2017 | Jannard | H04N 5/3675 |

* cited by examiner

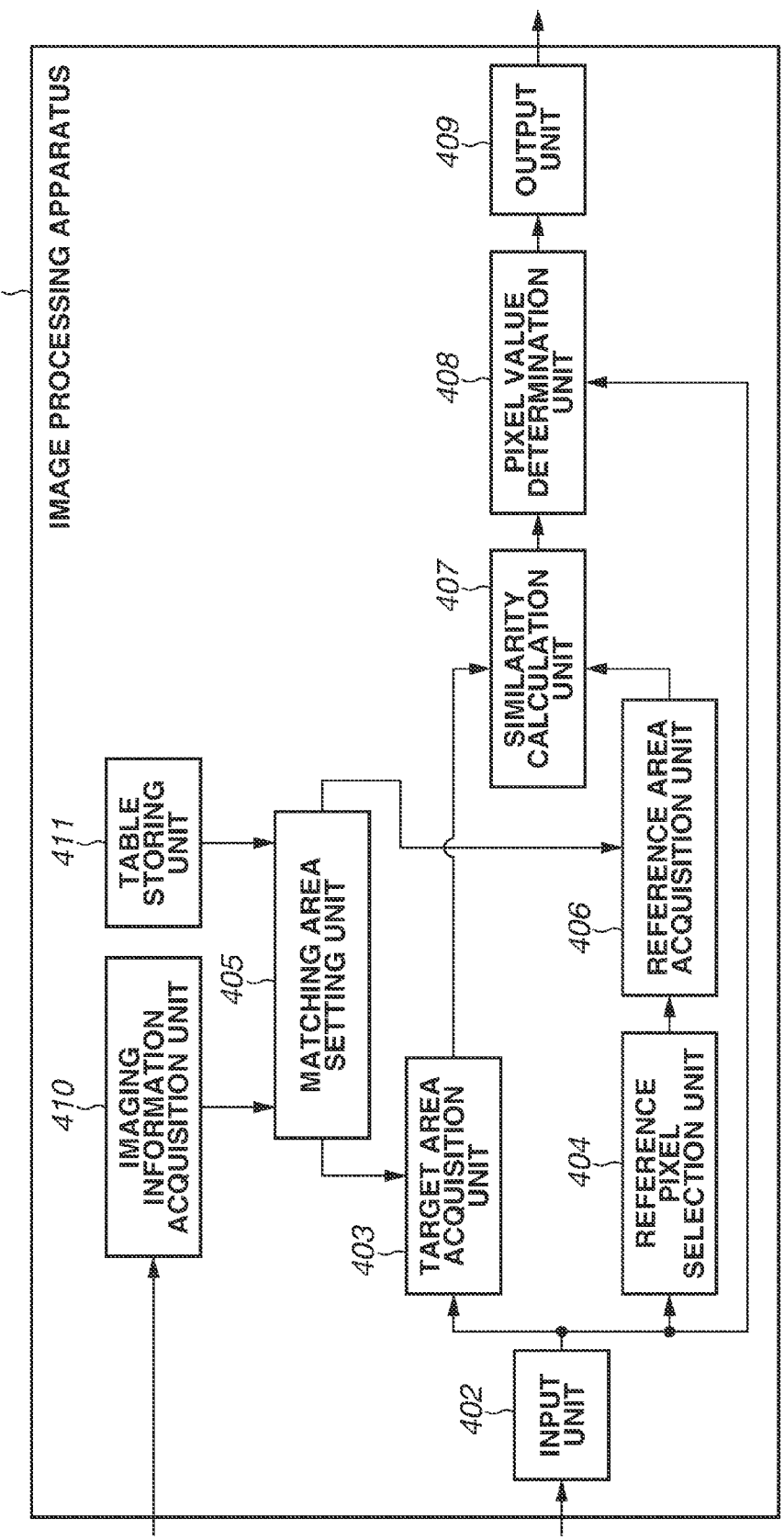

FIG.7

| NUMBER OF PIXELS | | ISO SENSITIVITY | | | | | |
|---|---|---|---|---|---|---|---|
| | | ... | 800 | 1600 | 3200 | 6400 | ... |
| EXPOSURE TIME | ⋮ | | | | | | |
| | 1/20 SECONDS | | a | b | c | d | |
| | 0.1 SECONDS | | a | b | c | d | |
| | 1 SECOND | | a | b | c | d | |
| | 2 SECONDS | | b | b | c | d | |
| | ⋮ | | | | | | |

IMAGE PROCESSING APPARATUS, IMAGE PROCESSING METHOD, AND STORAGE MEDIUM FOR NOISE REDUCTION PROCESSING

CROSS REFERENCE TO RELATED APPLICATIONS

The present application is a divisional of U.S. patent application Ser. No. 14/709,213, filed on May 11, 2015, which claims priority from Japanese Patent Application No. 2014-100845, filed May 14, 2014, all of which are hereby incorporated by reference herein in their entirety.

BACKGROUND OF THE INVENTION

Field of the Invention

The present invention relates to a technique for reducing noise included in image data.

Description of the Related Art

Digital imaging apparatuses, such as digital still cameras and digital video cameras, have been widely used. The digital imaging apparatus generates digital image data by converting, into a digital signal, light received by an imaging sensor such as a charged coupled device (CCD) sensor or a complementary metal oxide semiconductor (CMOS) sensor. Unfortunately, noise mixes into the digital image data because a process of generating the digital image data involves dark current noise, thermal noise, shot noise, and the like, due to characteristics of the imaging sensor and a circuit.

Thus, noise reduction processing is required to obtain high quality digital image data. One available noise reduction processing is a method of calculating a pixel value of a target pixel in image data using a plurality of reference pixels and through weighted averaging corresponding to the reference pixels. Japanese Unexamined Patent Application Publication (Translation of PCT Application) No. 2007-536662 and Japanese Patent Application Laid-Open No. 2011-39675 discuss methods of determining a similarity between a target pixel and a reference pixel by comparing an area including the target pixel and an area including the reference pixel, and obtaining a weight corresponding to the reference pixel, based on the similarity. With these methods, the weighted averaging is performed in such a manner that a larger weight is obtained for a reference pixel with a higher similarity, whereby noise is reduced.

As the number of pixels included in the area for determining the similarity between the target pixel and the reference pixel is increased, the similarity can be calculated more accurately, and thus a higher noise reduction effect can be achieved. Especially in a case where an amount of the noise included in the image data is large, if the similarity is determined with a small number of pixels in the area, the noise reduction effect might be low because the similarity in the image data including no noise can only be estimated with a limited level of accuracy. This is because a large weight might be applied to a reference pixel with a noise pattern similar to a noise pattern included in the area. In other words, a large weight is applied to a reference pixel to which a large weight is not supposed to be applied. Accordingly, the noise reduction effect of a weighted average value obtained as a pixel value of the target pixel might be low.

If the number of pixels included in the area for determining the similarity is increased, while the similarity of the image data including no noise can be obtained more accurately, the number of reference pixels with high similarity to the target pixel is reduced. As a result, a small number of pixels affects the weighted average value to be calculated as a noise-reduced pixel value of the target pixel. Thus, the noise reduction effect might be low.

SUMMARY OF THE INVENTION

The present invention is directed to a technique for executing appropriate noise reduction processing while reducing processing load, by changing the number of pixels used for calculating similarity, based on a noise amount in image data and an imaging condition related to the noise amount.

According to an aspect of the present invention, an image processing apparatus configured to execute noise reduction processing on image data includes a setting unit configured to set a pixel group from among a plurality of pixel group candidates, wherein the plurality of pixel group candidates includes at least a first pixel group having a plurality of pixels being a first number of pixels or a second pixel group having a plurality of pixels being a second number of pixels which is different from the first number of pixels, a determination unit configured to determine, based on a similarity between a target pixel and a reference pixel that is obtained according to the pixel group set by the setting unit, a weight corresponding to the reference pixel, and an output unit configured to output a value, calculated based on a pixel value of the reference pixel and the weight, as a noise-reduced pixel value of the target pixel.

Further features of the present invention will become apparent from the following description of exemplary embodiments with reference to the attached drawings.

BRIEF DESCRIPTION OF THE DRAWINGS

FIG. 4 is a block diagram illustrating a logical configuration of the image processing apparatus.

FIG. 7 is a diagram illustrating a table for setting a matching area.

DESCRIPTION OF THE EMBODIMENTS

Figure 1:
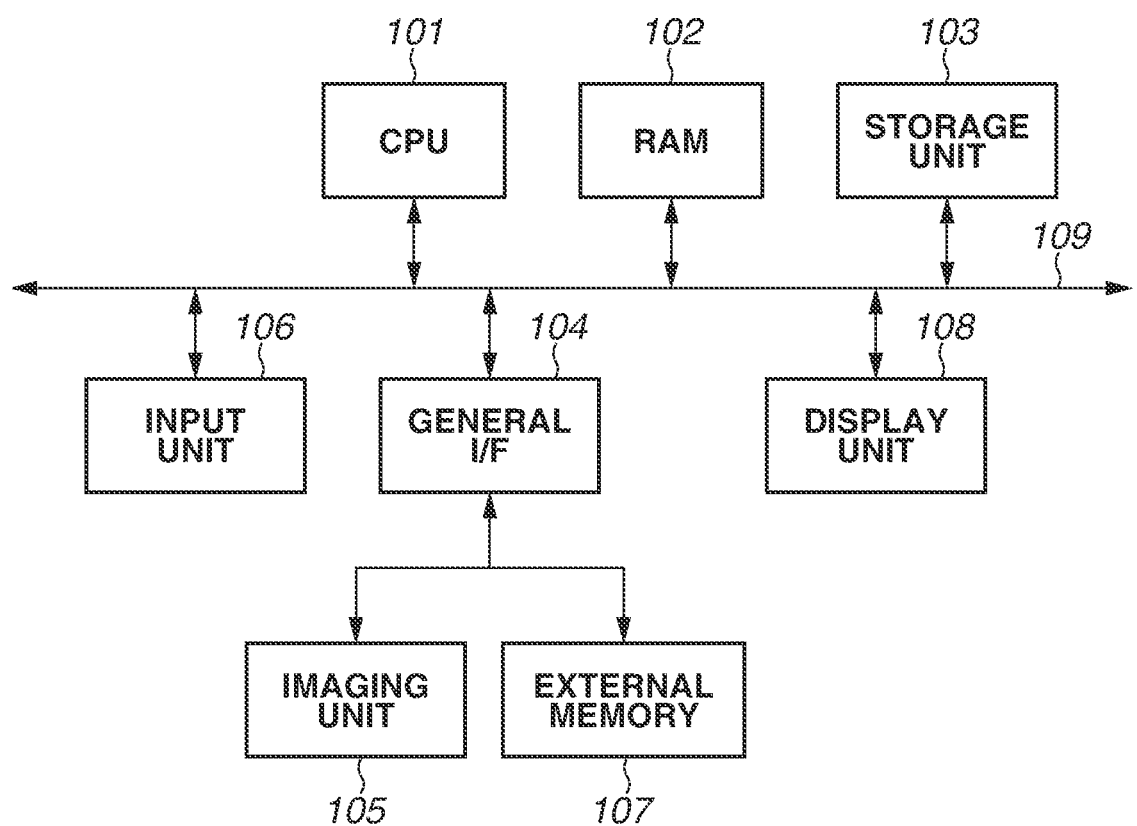
FIG. 1 is a schematic diagram illustrating a hardware configuration of an image processing apparatus.

Various exemplary embodiments, features, and aspects of the invention will be described in detail below with reference to the drawings. It is to be noted that the configurations described below in the exemplary embodiments are merely examples, and the present invention is not limited to the configurations illustrated in the drawings.

A first exemplary embodiment will be described. FIG. 1 is a diagram illustrating a hardware configuration of an image processing apparatus according to the first exemplary embodiment. In the present exemplary embodiment, a configuration example of a digital camera will be described as an example of the image processing apparatus. The image processing apparatus is, however, not limited to the digital camera described as an example of the image processing apparatus. For example, the image processing apparatus may be an information processing apparatus such as a mobile phone, a tablet device, or a personal computer, and may also be included in an imaging apparatus such as a camera phone.

The image processing apparatus according to the present exemplary embodiment includes a central processing unit (CPU) 101, a random access memory (RAM) 102, a storage unit 103, a general interface (I/F) 104, an imaging unit 105, an input unit 106, a display unit 108, and a main bus 109. The CPU 101 controls each unit of the image processing apparatus according to an input signal or a program described below. The storage unit 103 stores computer programs executed by the CPU 101 to implement various types of software. The CPU 101 operates software stored in the storage unit 103 to implement various types of image processing in the image processing apparatus. In this example, the description will be given of a case where the CPU 101 controls the entire apparatus. Alternatively, a plurality of hardware devices may share processing to control the entire apparatus.

The imaging unit 105 converts light focused by a lens included in the imaging unit 105 into an electrical signal to generate digital image data. The imaging unit 105 captures an image based on imaging instruction information input by a user via the input unit 106 described below, to generate digital image data. The imaging instruction information refers to, for example, an (International Organization for Standardization) ISO sensitivity, an exposure time, or an auto-focus (AF). The image data obtained by imaging is stored in a buffer memory, and then is subjected to predetermined image processing by the CPU 101. The storage unit 103 stores the resultant data.

The RAM 102 is used as a buffer memory for temporarily storing the image data obtained by imaging by the imaging unit 105, a memory for storing image data to be displayed on the display unit 108 and an instruction received via the input unit 106, a work area for the CPU 101, and the like.

The display unit 108 displays a viewfinder image during image capturing and the image data obtained by imaging. The display unit 108 may not be necessarily provided in the image processing apparatus as long as the display unit 108 has a function of performing display control for an external apparatus connectable via the general I/F 104.

The input unit 106 receives an instruction issued to the image processing apparatus from the user. The input unit 106 includes an operation member such as a power button for issuing an instruction to turn ON/OFF the image processing apparatus and a reproducing button for issuing an instruction to reproduce image data, for example. Alternatively, the display unit 108 may function as a touch panel, and the instruction from the user may be received via the display unit 108. In this case, the display unit 108 displays a user interface (UI) for the user inputting a desired instruction.

The general I/F 104 is an interface for connecting the image processing apparatus to the external apparatus. The general I/F 104 connects an external memory 107 such as a memory card to the main bus 109. In addition, the general I/F 104 may be configured to exchange data with a communication apparatus via infrared communication, a wireless local area network (LAN), and the like.

Various types of image processing executed by the CPU 101 will be described below. In the present exemplary embodiment, the CPU 101 executes noise reduction processing on the image data obtained by imaging by the imaging unit 105, and stores the noise-reduced image data in the storage unit 103.

Figure 2A:
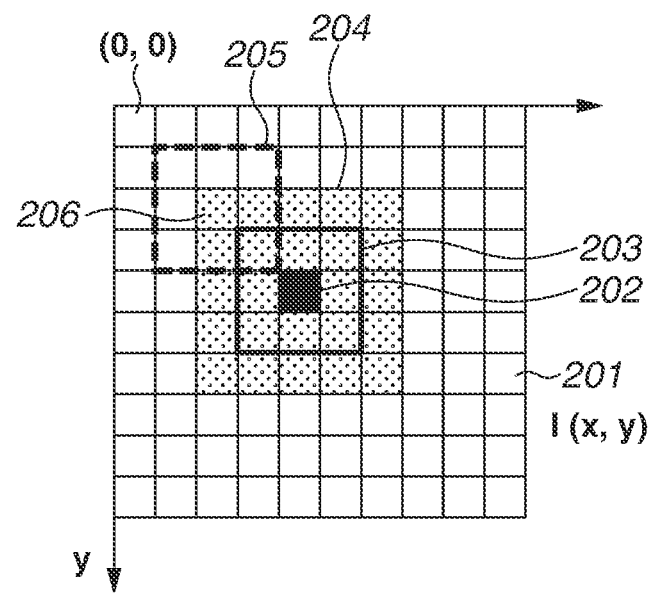
FIGS. 2A and 2B are schematic diagrams illustrating a noise reduction method.
Figure 2B:
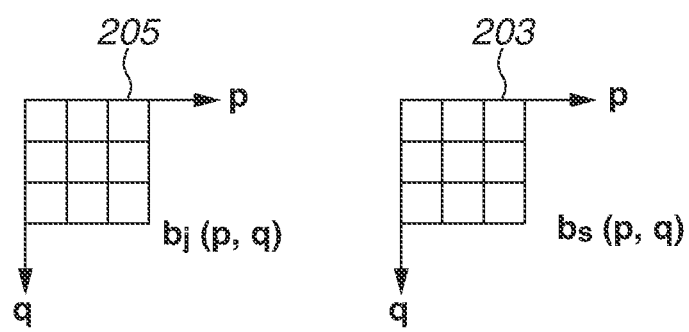

(Noise Reduction Processing by Non-Local Means)

algorithm The image processing executed by the CPU 101 in the present exemplary embodiment is noise reduction processing known as non-local means (NLM), typically a process in image processing for image denoising that may take a mean of all pixels in an image, weighted by how similar these pixels are to a target pixel. FIGS. 2A and 2B are diagrams illustrating the noise reduction processing by NLM. FIG. 2A illustrates image data 201. In the image data 201, if a pixel value of a pixel at the upper left corner is indicated as (0, 0), a pixel value of each pixel is indicated as I(x, y). Here, if a pixel 202 serves as a target pixel, a pixel value of the target pixel 202 is I (4, 4). A pixel value of the target pixel that is obtained after the noise reduction processing (hereinafter, also referred to as an output value) is determined through weighted averaging using pixel values of reference pixels and weights respectively corresponding to the reference pixels. More specifically, a noise-reduced pixel value $I_{new}$ of the target pixel is obtained by the following Formula (1):

$$I_{new} = \frac{\sum_{j=1}^{N_s} w_j \times I_j}{\sum_{j=1}^{N_s} w_j}, \quad (1)$$

where $N_s$ represents the number of reference pixels used for the weighted averaging, $I_j$ (j=1 to $N_s$) represents a pixel value of a reference pixel, and $w_j$ (j=1 to $N_s$) represents a weight corresponding to the reference pixel.

The weight corresponding to the reference pixel is calculated based on the similarity of the reference pixel to the target pixel. In the noise reduction processing known as NLM, the similarity between the target pixel and the reference pixel is determined by using an area including the target pixel and an area including the reference pixel. The area used for determining the similarity is referred to as a matching area. The description will be given using the image data 201 illustrated in FIG. 2A as an example. Here, a 5×5 pixels rectangular area 204 including the target pixel 202 is set as a reference pixel group, and each of 25 pixels included in the reference pixel group is set as a reference pixel. In addition, a 3×3 pixels area is set as a matching area. The similarity between the target pixel and the reference pixel is calculated based on the set matching area. If a pixel 206 is set as a reference pixel, the similarity between the target pixel 202 and the reference pixel is determined by comparing a pixel group 203 (hereinafter, referred to as a target area 203) including the target pixel 202 and a pixel group 205 (hereinafter, referred to as a reference area 205) including the reference pixel 206. More specifically, a similarity is obtained based on a sum of squared differences (SSD) between pixel values of pixels in the target area 203 and pixel values of the corresponding pixels in the reference area 205. A similarity $C_j$ is obtained by the following Formula (2):

$$C_j = \sum_p \sum_q (b_j(p, q) - b_s(p, q))^2, \quad (2)$$

where $b_s (p, q)$ represents a pixel in the target area 203 and $b_j (p, q)$ (j=1 to $N_s$) represents a pixel in the reference area 205, as illustrated in FIG. 2B.

A smaller similarity $C_j$ indicates that the target pixel and the reference pixel are more similar to each other. The similarity $C_j$, which is the SSD of the pixel values of the corresponding pixels in the target and the reference areas, may also be obtained by using the sum of absolute values of differences, an evaluation function, or the like.

Figure 3:
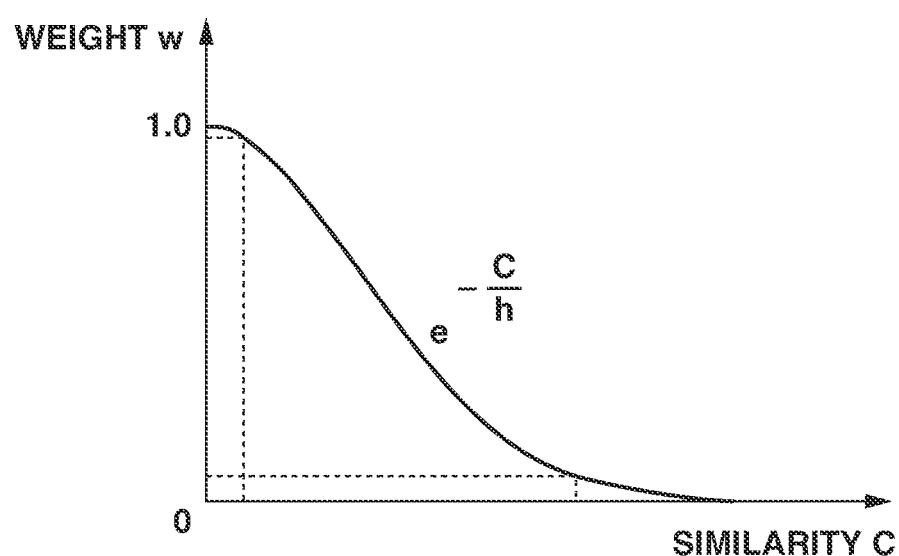
FIG. 3 is a schematic diagram illustrating a function for calculating a weight according to a similarity.

Next, the weight corresponding to the reference pixel is obtained according to the similarity. FIG. 3 is a diagram illustrating an example of a function for obtaining the weight according to the similarity. It is only required that a larger weight is determined for a smaller similarity $C_j$ while a smaller weight is determined for a larger similarity $C_j$. For example, the weight is determined by the following Formula (3):

$$w_j = \exp\left(-\frac{C_j}{h^2}\right), \quad (3)$$

where, h represents a variable for controlling the weight. The larger variable h leads to a higher noise reduction effect but also involves blurring of edges in the image data. Each of the pixels included in the reference pixel group 204 is set as the reference pixel, and the weight corresponding to each reference pixel is determined as described above. In the present exemplary embodiment, the target pixel is also set as the reference pixel.

(Logical Configuration of Image Processing Apparatus)

FIG. 4 is a block diagram illustrating a logical configuration of the image processing apparatus according to the present exemplary embodiment. An image processing apparatus 401 according to the present exemplary embodiment sets a matching area based on the ISO sensitivity and the exposure time that are set when an image is captured. The ISO sensitivity and the exposure time serve as information related to noise corresponding to image data to be processed.

An input unit 402 inputs image data obtained by imaging by the imaging unit 105, based on an instruction from the CPU 101. The image data is input from the storage unit 103 and the external memory 107. An imaging information acquisition unit 410 acquires imaging information of when image data to be processed is obtained by imaging, as the information related to a noise amount in the image data to be processed. In the present exemplary embodiment, the ISO sensitivity and the exposure time, which are set when the image is captured, are acquired as the imaging information. The imaging information acquisition unit 410 acquires the ISO sensitivity and the exposure time from header information of the image data. Alternatively, the imaging information may be directly acquired from the imaging unit 105, instead of being acquired from the header information of the image data. Yet alternatively, the imaging information corresponding to the image data may be acquired from the storage unit 103 or the external memory 107. The imaging information acquisition unit 410 outputs the acquired imaging information to a matching area setting unit 405.

The matching area setting unit 405 sets the matching area based on the imaging information related to the noise corresponding to the image data. The matching area setting unit 405 sets the matching area including the number of pixels appropriate for the noise amount in the image data predicted from the imaging information. The matching area setting unit 405 refers to a table stored by a table storing unit 411. The processing will be described in detail below.

A target area acquisition unit 403 acquires a pixel value of a target pixel in the input image data, and pixel values of pixels included in the target area corresponding to the matching area. For example, as illustrated in FIG. 2A, when an area including 3×3 pixels is set as the matching area, the target area acquisition unit 403 acquires pixel values of nine pixels included in a 3×3 rectangular area including the target pixel at the center. The target area acquisition unit 403 outputs each of the acquired pixel values to a similarity calculation unit 407.

A reference pixel selection unit 404 selects a reference pixel to be used for the weighted averaging for calculating the output value of the target pixel. The reference pixel selection unit 404 sequentially selects, as a reference pixel, unprocessed pixels from a predetermined reference pixel group. As illustrated in FIG. 2A, when 25 pixels including the target pixel are set as the reference pixel group, the reference pixel selection unit 404 selects a reference pixel 25 times for the target pixel. The reference pixel selection unit 404 outputs information indicating a pixel position of the selected pixel to a reference area acquisition unit 406.

The reference area acquisition unit 406 acquires, from the image data input by the input unit 402, a pixel value of the reference pixel selected by the reference pixel selection unit 404 and pixel values of pixels included in a reference area determined based on the matching area. As in the case of the target area acquisition unit 403, when the area including 3×3 pixels is set as the matching area, the reference area acquisition unit 406 acquires pixel values of nine pixels included in the 3×3 rectangular area including the reference pixel at the center. Positions of pixels included in the target area respectively correspond to those of pixels included in the reference area. The reference area acquisition unit 406 outputs the acquired pixel values of the respective pixels to the similarity calculation unit 407.

The similarity calculation unit 407 calculates, according to Formula (2), the similarity of the reference pixel to the target pixel, based on the SSD obtained by calculating the differences between the corresponding pixels in the target and the reference areas and by summing the squares of the differences. The similarity calculation unit 407 outputs the similarity corresponding to the reference pixel to a pixel value determination unit 408. In the present exemplary embodiment, 25 pixels included in the reference pixel group are set as the reference pixels for calculating the output value of the target pixel. Thus, the similarity calculation unit 407 calculates the similarity 25 times to determine the output value of the target pixel.

The pixel value determination unit 408 determines the output value of the target pixel based on the similarity received from the similarity calculation unit 407 and the pixel value of each reference pixel that is received from the input unit 402. As indicated in Formula (1), the output value of the target pixel is obtained by calculating the weighted average using the pixel values of the reference pixels and the corresponding weights. The pixel value determination unit 408 sequentially outputs the output value of the target pixel to an output unit 409.

The output unit 409 outputs output image data including the noise-reduced output value, for all the pixels. The output unit 409 temporarily stores the output image data into the RAM 102 in response to an instruction from the CPU 101, and then outputs the output image data to the display unit 108 and the storage unit 103. Alternatively, the output image data may be output to the external memory 107 connected to the general I/F 104.

(Matching Area Setting)

Now, the processing executed by the matching area setting unit 405 will be described in detail. In the present exemplary embodiment, the similarity of the reference pixel to the target pixel is calculated based on the differences in pixel value between the target area including the target pixel and the reference area including the reference pixel. In other words, the similarity is determined based on a similarity between a pattern of the pixel values in the target area and a pattern of the pixel values in the reference area. The noise-reduced value of the target pixel is calculated by averaging random noise components by performing weighted averaging in such a manner that a large weight is applied to a pixel value with a similar pattern. Generally, the similarity can be calculated more accurately as the number of pixels included in the matching area for calculating the similarity is increased. Especially in a case where the noise in the image data is large, the patterns of the pixel values in the target and the reference areas which correspond to the matching area are heavily affected by the noise components. Thus, when the similarity is calculated with a small number of pixels, the pattern of the noise components in the target area remains, and thus the noise reduction effect on the target pixel is low. When the number of pixels included in the matching area is set to be large, the noise components can be averaged regardless of the pattern of the random noise components in the target area. However, if the number of pixels included in the matching area is increased, it becomes more difficult to determine whether the pattern of the pixel values in the reference area is similar to that in the target area. More specifically, when the number of pixels in the matching area is large, the value indicating the similarity is likely to be large when pixels other than the target pixel are set as the reference pixel. In the present exemplary embodiment, the smaller value of similarity indicates a higher similarity between the pattern in the target area and the pattern in the reference area. Thus, a smaller weight is applied for a higher similarity. All things considered, the pixel values of the target pixel that are respectively obtained before and after the noise reduction processing are almost the same, and thus the noise reduction effect is unlikely to be obtained. In view of the above, a matching area including an appropriate number of pixels needs to be set to calculate the similarity between the target pixel and the reference pixel. In particular, the appropriate number of pixels in the matching area varies according to the noise amount in the image data.

Figure 5A:
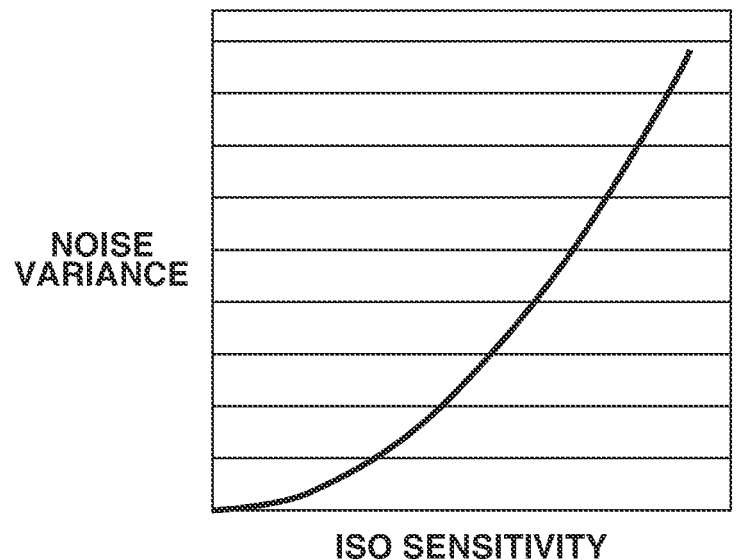
FIG. 5A is a diagram illustrating a relationship between a noise variance and an ISO (International Organization for Standardization) sensitivity serving as imaging information.
Figure 5B:
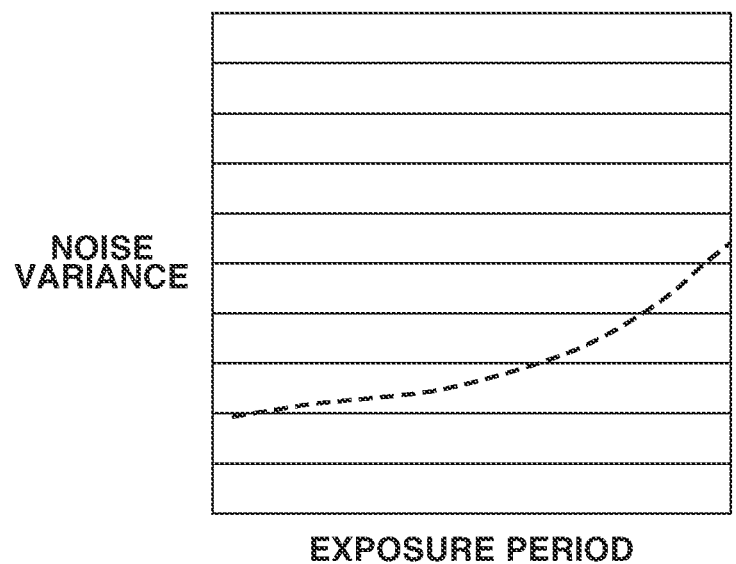
FIG. 5B is a diagram illustrating a relationship between a noise variance and an exposure time serving as imaging information.

Noise characteristics of the image data vary according to the ISO sensitivity and the exposure time that are set when the image is captured. Thus, in the present exemplary embodiment, the matching area including the appropriate number of pixels is determined based on the ISO sensitivity and the exposure time that are related to the noise in the image data. FIGS. 5A and 5B are diagrams schematically illustrating a relationship between the ISO sensitivity and a noise variance and a relationship between the exposure time and the noise variance, respectively. The vertical axis in FIGS. 5A and 5B represents the noise variance in the image data. The image data involving a smaller noise variance includes a smaller amount of noise, and thus is more likely to have higher visibility than an image involving a large noise variance. Thus, the noise amount in the image data can be evaluated based on the noise variance. The noise characteristic illustrated in FIG. 5A can be obtained by using a plurality of pieces of image data obtained by imaging by the imaging unit 105 with different ISO sensitivities and with imaging conditions other than the ISO sensitivity fixed. The noise characteristic illustrated in FIG. 5A is obtained by calculating the noise variances of the image data pieces respectively corresponding to the ISO sensitivities, and by interpolating between the noise variances. As illustrated in FIG. 5A, when an image is captured with the ISO sensitivity set at a higher value, the noise amount in the image data increases. Setting the ISO sensitivity at a higher value means increasing the gain of sensor output in the imaging, and thus the noise amount is amplified, resulting in a large noise variance. Similarly, in FIG. 5B, a plurality of image data pieces are obtained with different exposure times and with the imaging conditions other than the exposure time fixed. The noise characteristic illustrated in FIG. 5B can be obtained by calculating the noise variances in the image data pieces respectively corresponding to the exposure times, and by interpolating between the noise variances. As illustrated in FIG. 5B, as an exposure time set for the imaging increases, a noise amount in the image data accordingly increases. This is because the amount of light received by the sensor increases as the exposure time increases.

Figure 6A:
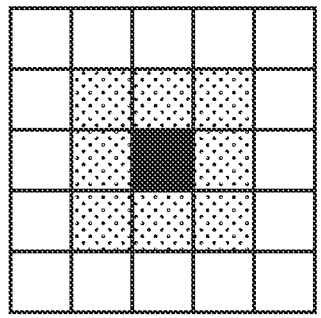
FIGS. 6A to 6F are schematic diagrams each illustrating an example of matching area setting.
Figure 6B:
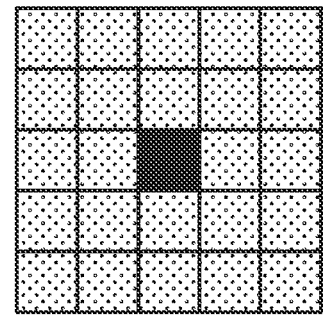
Figure 6C:
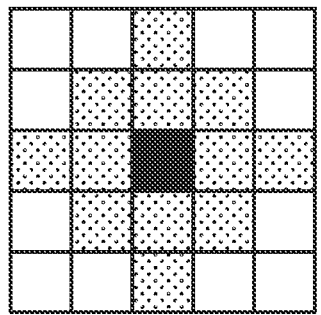
Figure 6D:
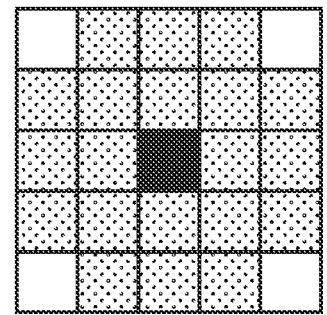

In the present exemplary embodiment, the matching area setting unit 405 sets the matching area including an appropriate number of pixels, based on the ISO sensitivity and the exposure time that affect the noise amount in the image data. FIGS. 6A to 6D illustrate four matching areas set by the matching area setting unit 405 according to the present exemplary embodiment. FIG. 6A illustrates a matching area including 3×3 pixels, i.e., nine pixels. FIG. 6B illustrates a matching area including 5×5 pixels, i.e., 25 pixels. FIG. 6C illustrates a matching area including 13 pixels. In FIG. 6C, the Manhattan distance from the center pixel to each of the 13 pixels is equal to or smaller than 2. FIG. 6D illustrates a matching area including 21 pixels obtained by subtracting four pixels at the four corners from a 5×5 rectangular area. The matching area setting unit 405 according to the present exemplary embodiment sets any one of the pixel arrangements illustrated in FIGS. 6A to 6F as the matching area, according to the ISO sensitivity and the exposure time. FIG. 7 illustrates an example of a table for setting the matching area that is stored by the table storing unit 411. In FIG. 7, a, b, c, and d, representing the number of pixels, satisfy the relationship a<b<c<d. Since the noise amounts in image data obtained by imaging using respective imaging conditions illustrated in FIGS. 5A and 5B are identified, the number of pixel is set according to the noise amount in the image. A large amount of pixels is used when the ISO sensitivity is high and the exposure time is long. A medium amount of pixels is used when the ISO sensitivity is high and the exposure time is short. A small amount of pixels is used when the ISO sensitivity is low and the exposure time is short.

(Processing Flow in Image Processing Apparatus)

Figure 8:
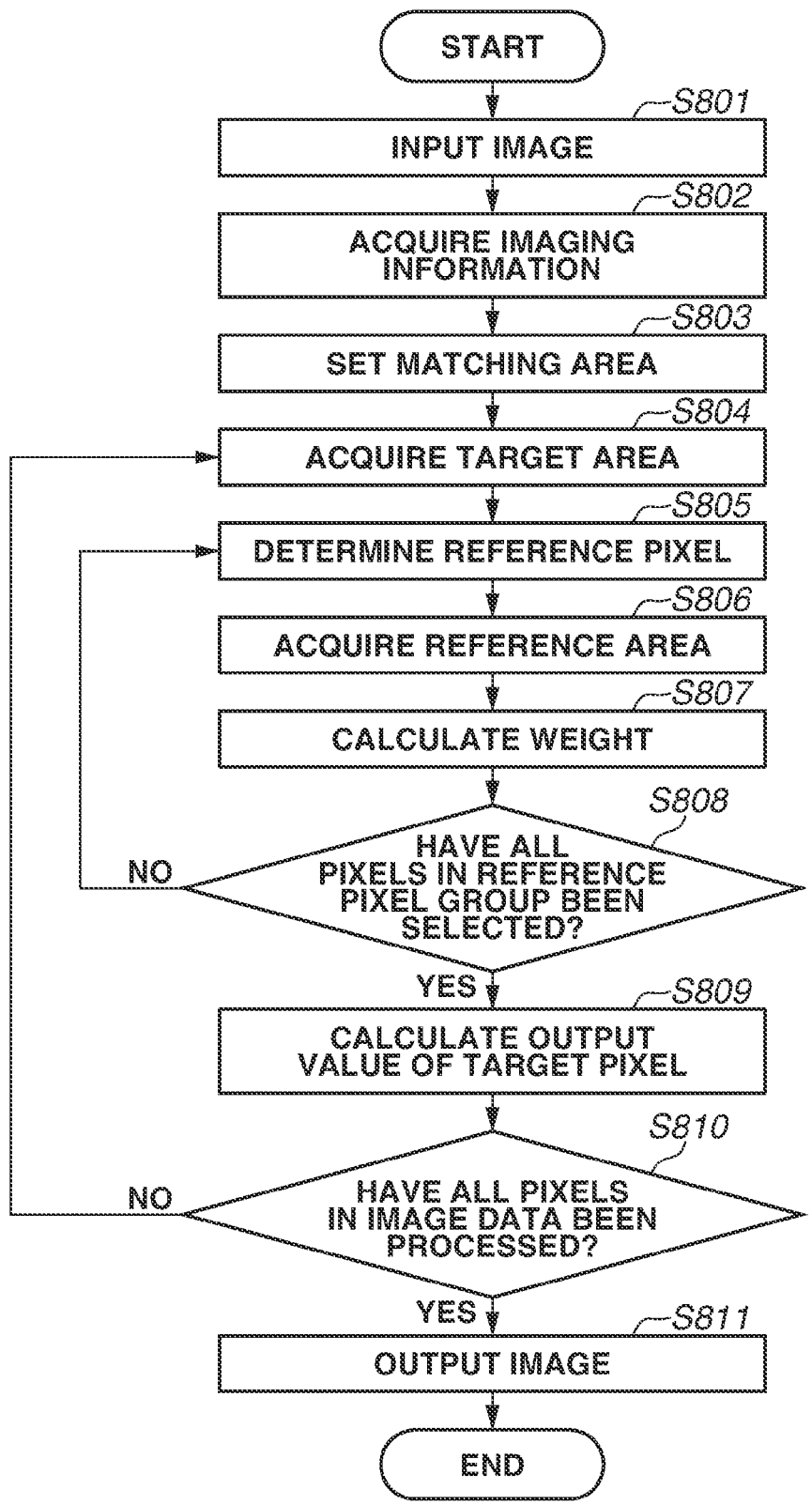
FIG. 8 is a flowchart illustrating processing in the image processing apparatus.

FIG. 8 is a flowchart illustrating processing in the image processing apparatus that is executed by the CPU 101. In step S801, the input unit 402 inputs image data obtained by imaging by the imaging unit 105.

In step S802, the imaging information acquisition unit 410 acquires, as the imaging information, the ISO sensitivity and the exposure time of the imaging unit 105 that are set when the imaging unit 105 captures an image to obtain the digital image data to be processed. In step S803, the matching area setting unit 405 sets the matching area for executing the noise reduction processing by the NLM on the image data to be processed. The matching area refers to a pixel group used for determining the similarity between a target pixel and a reference pixel. By referring to the table that is illustrated in FIG. 7 and stored by the table storing unit 411, the matching area setting unit 405 sets the matching area including an appropriate number of pixels, according to noise. In this example, the matching area illustrated in FIG. 6B is set.

In step S804, the target area acquisition unit 403 acquires pixel values of the pixels in the target area including the target pixel. The target area is a pixel group corresponding to the area set by the matching area setting unit 405. Thus, in this example, the pixel values of the pixels in the 5×5 rectangular area including the target pixel at the center are acquired.

In step S805, the reference pixel selection unit 404 selects a pixel that has not been subjected to the processing of calculating the similarity, from among the reference pixels used for calculating the output value of the target pixel included in the reference pixel group. In step S806, the reference area acquisition unit 406 acquires the pixel values of the pixels included in the reference area including the reference pixel. The reference area is the pixel group corresponding to the area set by the matching area setting unit 405, as in the case of the target area. Thus, the pixel values of the pixels included in the 5×5 area including the selected reference pixel at the center are acquired.

In step S807, the similarity calculation unit 407 calculates the similarity between the target pixel and the reference pixel, based on the difference in pixel value between the corresponding pixels in the target and the reference areas. In the present exemplary embodiment, the similarity is the SSD between the target and the reference areas, as indicated in Formula (2). A smaller SSD of the pixel values indicates that a pattern of the pixel values in the reference area is more similar to a pattern of the pixel values in the target area. In this example, the area illustrated in FIG. 6B is set as the matching area. Thus, the difference between the pixel values at the corresponding pixel positions is calculated for 25 pixels. The SSD of the 25 pixels is calculated as the similarity corresponding to the reference pixel.

In step S808, it is determined whether the reference pixel selection unit 404 has selected all the pixels in the reference pixel group. When there is an unprocessed pixel, the processing returns to step S805, whereby the processing in steps S806 and S807 is repeated with the unprocessed pixel set as the reference pixel. In this example, the 5×5 rectangular area including the target pixel at the center is set as the reference pixel group. Thus, the processing in steps S806 and S807 is repeatedly executed on the 25 pixels. When it is determined in step S808 that the similarity has been calculated for all the pixels in the reference pixel group, the processing proceeds to step S809.

In step S809, the pixel value determination unit 408 calculates the output value of the target pixel according to Formula (1), from the pixel values of respective reference pixels and the corresponding similarities. The output value of the target pixel calculated by Formula (1) is the noise-reduced pixel value compared with the original pixel value of the target pixel.

The processing described above is executed on all the pixels in the image data in such a manner that each pixel is set as the target pixel. When it is determined in step S810 that the output values for all the pixels in the image data have been calculated, noise-reduced image data is obtained. In step S811, the output unit 409 outputs the noise-reduced image data, and the noise reduction processing in the present exemplary embodiment is terminated.

As described above, in the present exemplary embodiment, the pixel group around each pixel that is required for calculating the similarity between the target and the reference pixels is determined based on the ISO sensitivity and the exposure time that are related to the noise amount. More specifically, when an image is captured with the ISO sensitivity and the exposure time for which a noise variance in the image data is predicted to be large, the target and the reference areas each including a larger number of pixels are compared. Thus, the similarity between the target and the reference pixels can be calculated using the appropriate number of pixels according to the noise amount in the image data. Furthermore, if the matching area includes a smaller number of pixels, the similarity between the target pixel and the reference pixel can be calculated with a smaller calculation amount. Accordingly, in the present exemplary embodiment, the calculation cost of the noise reduction processing can be reduced.

In the first exemplary embodiment, the number of pixels included in the matching area for comparing the target area with the reference area is set according to the imaging conditions with which the noise in the image data can be predicted. Alternatively, an imaging environment may be used as the imaging information related to the noise.

Figure 9A:
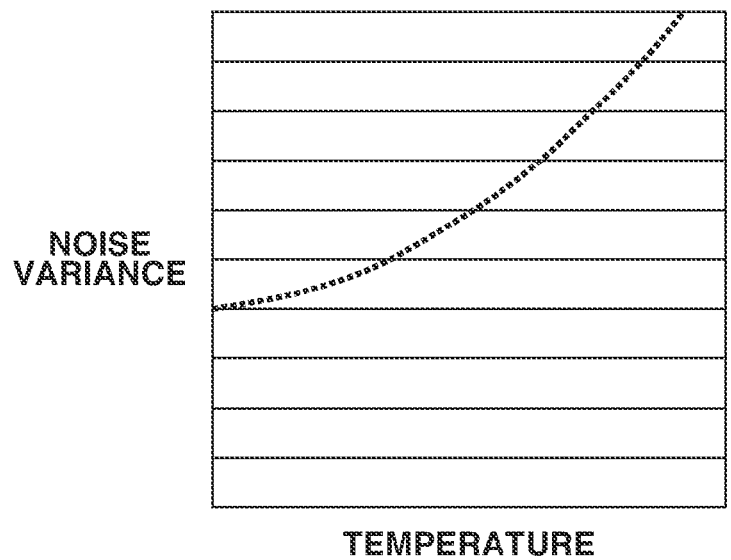
FIG. 9A is a schematic diagram illustrating a relationship between a noise variance and a sensor temperature.

FIG. 9A illustrates a relationship between a sensor temperature and a noise variance in the image data. In FIG. 9A, the vertical axis represents the noise variance in the image data and the horizontal axis represents the sensor temperature. The sensor temperature can be acquired from a thermometer attached to the sensor incorporated in the imaging unit 105. The noise characteristic illustrated in FIG. 9A can be obtained by using a plurality of pieces of image data obtained by imaging by the imaging unit 105 at different constant sensor temperatures with the other imaging conditions fixed. It is a known fact that the image data obtained by imaging at the high sensor temperature involves a large noise variance, as illustrated in FIG. 9A. This is because thermal noise increases with the rise in the sensor temperature.

Figure 9B:
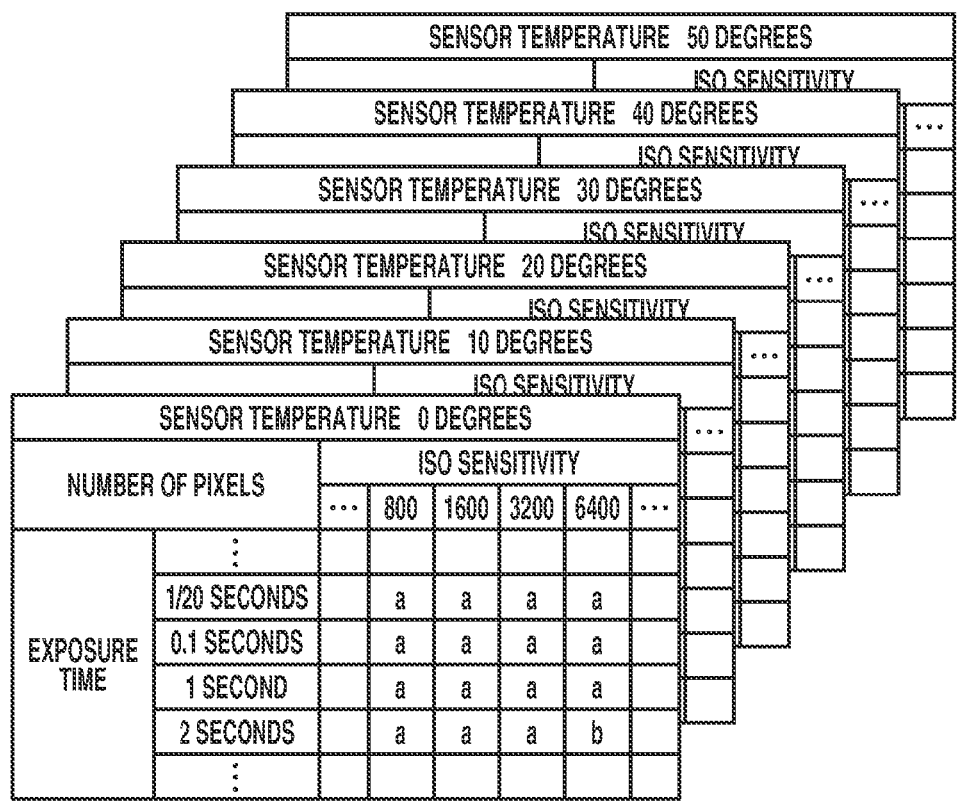
FIG. 9B is a diagram illustrating a table for setting a matching area.

FIG. 9B is a three-dimensional table for setting the matching area based on the ISO sensitivity, the exposure time, and the sensor temperature. In the table, the matching area including a large number of pixels is set for the image data obtained by imaging under the conditions of a high ISO sensitivity, a long exposure time, and a high sensor temperature.

The matching area setting unit 405 can set the matching area more appropriately by acquiring the ISO sensitivity, the exposure time, and the sensor temperature as the imaging information, and referring to the table illustrated in FIG. 9B.

In the first exemplary embodiment, the description has been given of the example where the matching area is set by referring to the ISO sensitivity and the exposure time. However, in some cases, not both the ISO sensitivity and the exposure time can be acquired as the imaging information, depending on the image data, the imaging condition, and the like. Thus, in view of the foregoing cases, it is desirable that the apparatus is configured in such a manner that the matching area can be set even when only one of the imaging information pieces can be acquired.

More specifically, a fixed value of the imaging information is set in advance so as to be used when the corresponding imaging condition is unknown. As a result, the matching area can be appropriately set even when only one of the imaging information pieces can be obtained. For example, even if the information indicating the exposure time cannot be acquired, a column to be used when the exposure time is unknown can be prepared by setting a certain exposure time as the fixed value. The matching area corresponding to the acquired ISO sensitivity is set based on the column. With this configuration, the matching area can be set at least according to the acquired imaging information. A value most likely to be used or an average value is desirably selected as the pixel value to be used when the corresponding imaging information is unknown.

In the first exemplary embodiment, the matching area is set based on the imaging information pieces set when the image data to be noise-processed is obtained by imaging. In this case, a single matching area is set for the entire image data. The image data includes areas with different noise characteristics. Thus, in a second exemplary embodiment, a method of setting a matching area for each pixel will be described. The configurations similar to those in the first exemplary embodiment are assigned the same reference numerals and will not be described.

Figure 10:
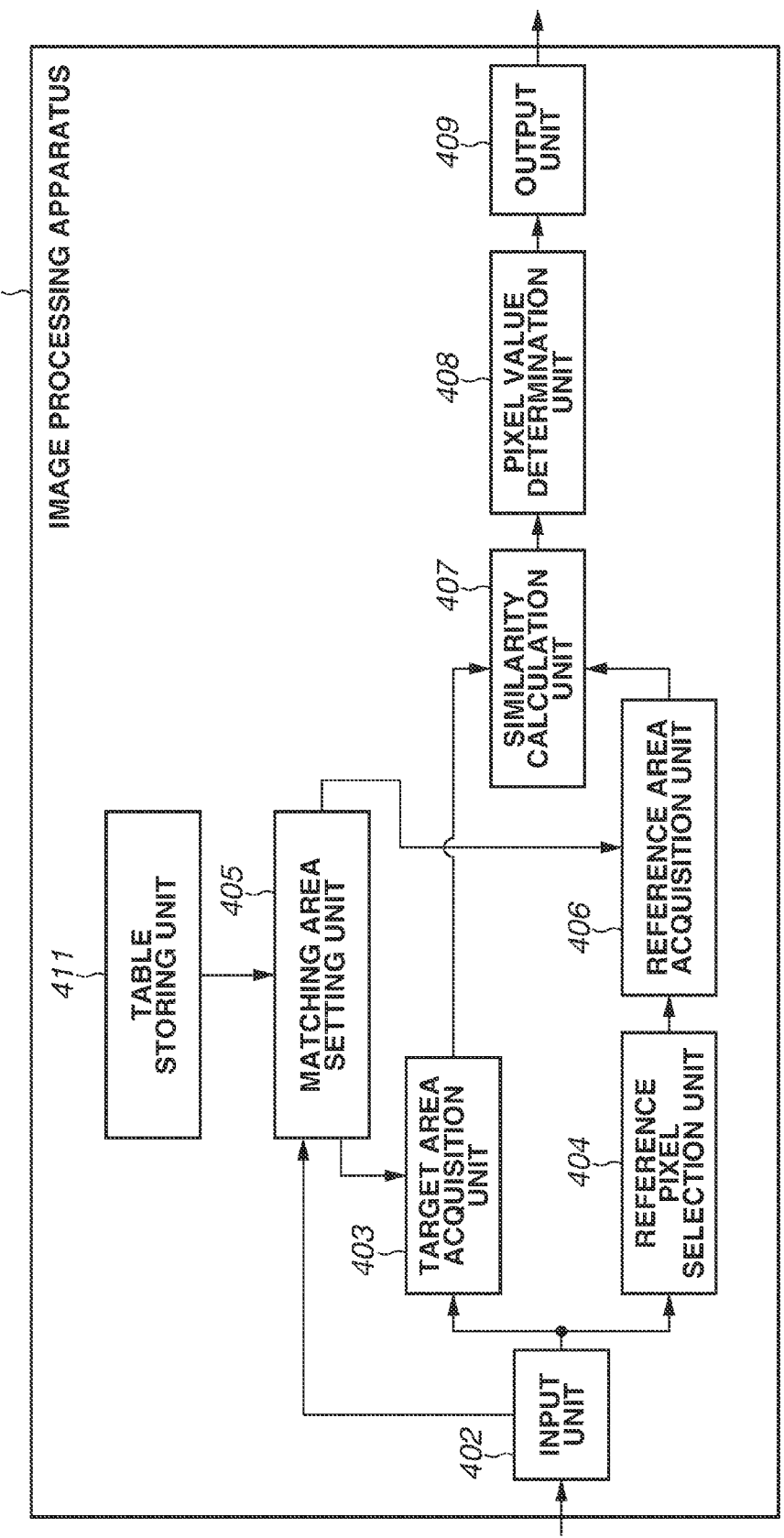
FIG. 10 is a block diagram illustrating a logical configuration of an image processing apparatus.
Figure 11:
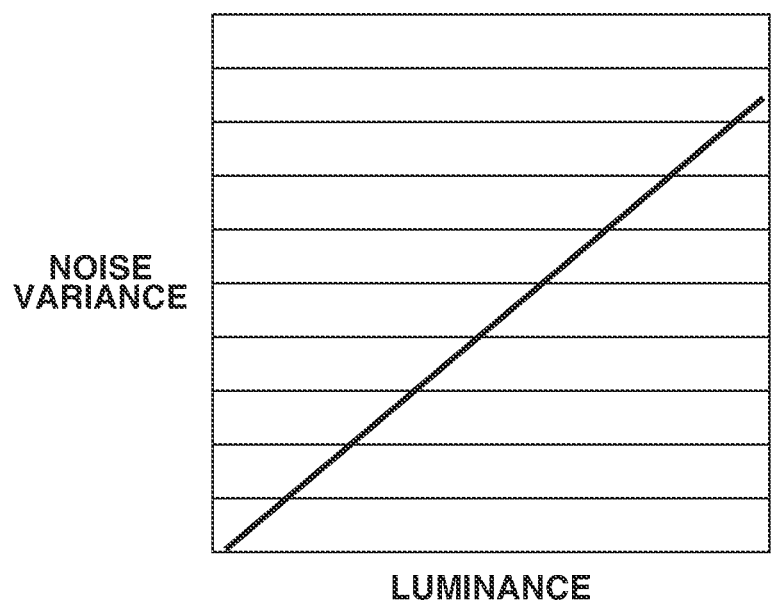
FIG. 11 is a schematic diagram illustrating a relationship between a noise variance and a pixel value

FIG. 10 illustrates an image processing apparatus 401 according to the second exemplary embodiment. FIG. 11 is a diagram illustrating a relationship between a pixel value (luminance) and a noise variance. The noise characteristic illustrated in FIG. 11 can be obtained by using a plurality of image data pieces obtained by imaging with different luminances and with the other imaging conditions fixed. As illustrated in FIG. 11, it is a known fact that a larger pixel value indicating a higher luminance and a larger light amount involves a larger noise amount. Thus, a matching area setting unit 405 of the present exemplary embodiment sets the matching area by using the pixel value of the target pixel, as the information related to the noise in the image data.

Figure 12:
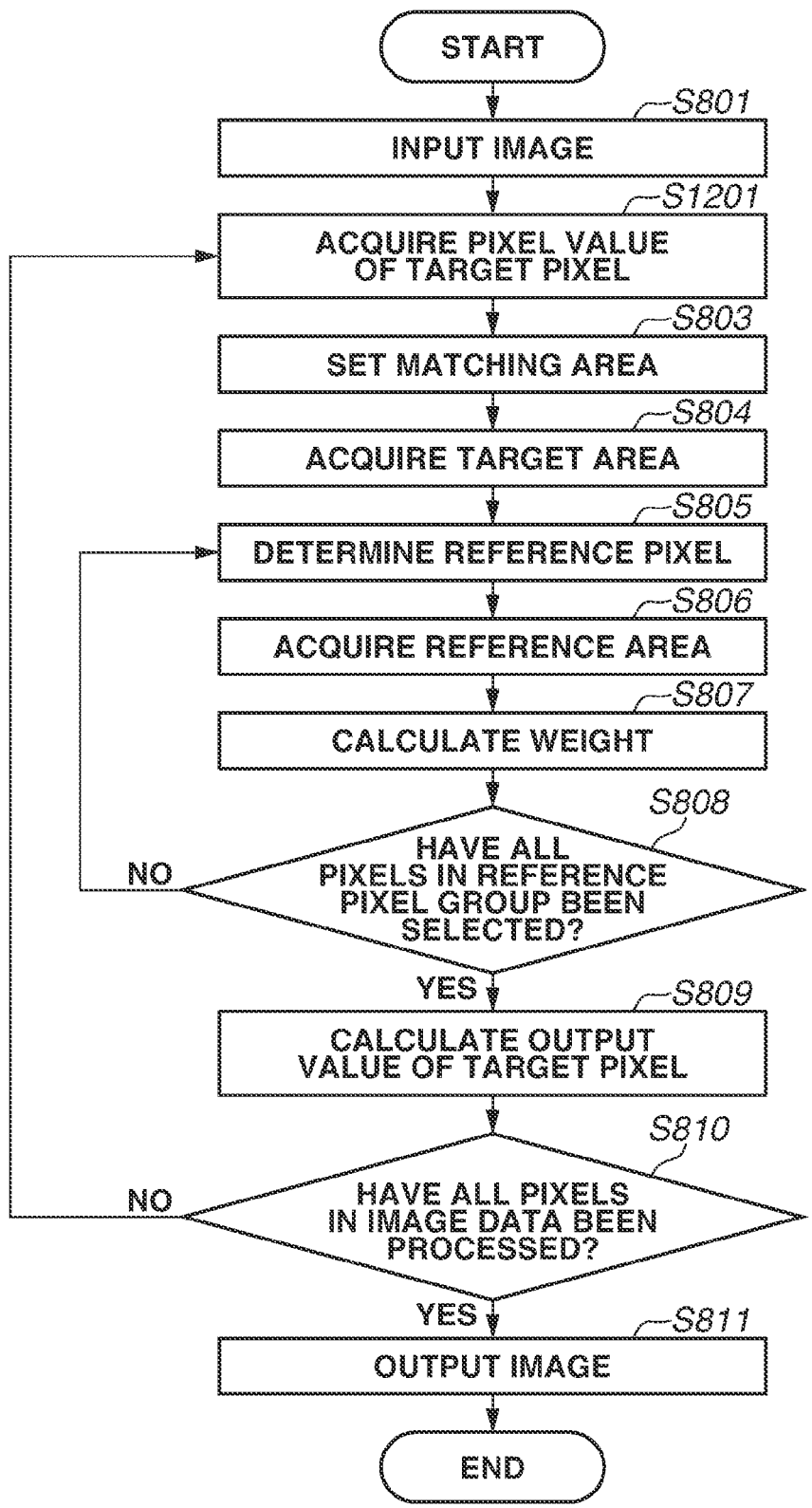
FIG. 12 is a flowchart illustrating processing in the image processing apparatus.

FIG. 12 is a flowchart illustrating processing executed in the image processing apparatus 401 according to the second exemplary embodiment. After the image data is input in step S801, in step S1201, the matching area setting unit 405 acquires the pixel value of the target pixel from the input unit 402. In step S803, the matching area setting unit 405 determines the matching area according to the pixel value of the target pixel. For example, as described above, since the larger pixel value involves a larger noise amount in the image data, the matching area setting unit 405 sets the matching area including a larger number of pixels as the pixel value increases. As in the first exemplary embodiment, when the matching area is set to be any one of the four matching areas illustrated in FIGS. 6A to 6D, any one of the matching areas illustrated in FIGS. 6A to 6D can be determined by setting three levels of thresholds for the pixel value. For example, if thresholds Th1, Th2, and Th3 are assumed to satisfy a relationship Th1>Th2>Th3, the matching area illustrated in FIG. 6B, which includes the largest number of pixels, is set for the pixel value equal to or larger than the threshold Th1. The matching area illustrated in FIG. 6D is set for the pixel value smaller than the threshold Th1 and equal to or larger than the threshold Th2. The matching area illustrated in FIG. 6C is set for the pixel value smaller than the threshold Th2 and equal to or larger than the threshold Th3. The matching area illustrated in FIG. 6A is set for the pixel value smaller than the threshold Th3. The processing thereafter is similar to that in the exemplary embodiment described above.

The second exemplary embodiment is different from the first exemplary embodiment in that the matching area is set for each pixel in the image data to be processed. Thus, after the output value of the target pixel is calculated in step S809, it is determined in step S810 whether the processing has been executed on all the pixels in the image data. If it is determined in step S810 that there is an unprocessed pixel, the processing returns to step S1201, and the processing is repeated from the acquisition of the pixel value and setting of the matching area.

In the second exemplary embodiment, the matching area is set by using the pixel value of the target pixel. Alternatively, the information related to the noise amount of each pixel may not be the pixel value of the target pixel, and may be an average or a median value of the pixel values of the pixels included in the target area. Alternatively, the average value of the pixel values may be calculated for each area in the image data, and the matching area may be set for each area.

In the exemplary embodiments described above, the matching area for calculating the similarity is set based on the information such as the imaging information and the pixel value, with which the noise characteristic can be predicted. In a third exemplary embodiment, the description will be given of a method in which the image data is analyzed to estimate the actual noise amount in the image data, and the matching area is set according to the estimated noise amount. The configurations similar to those in the first exemplary embodiment are assigned the same reference numerals and will not be described.

Figure 13:
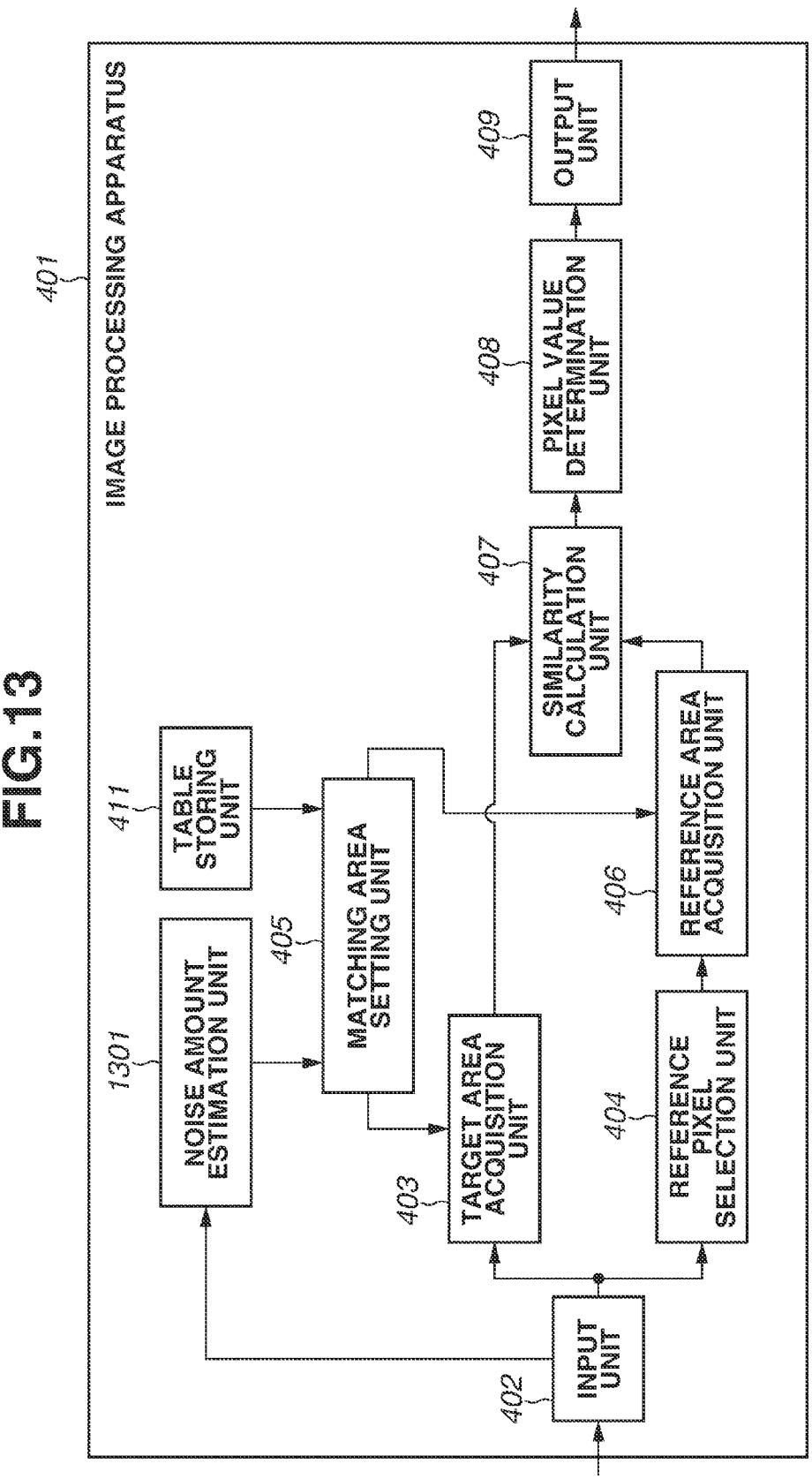
FIG. 13 is a block diagram illustrating a logical configuration of an image processing apparatus.

FIG. 13 illustrates an image processing apparatus 401 according to the third exemplary embodiment. The image processing apparatus 401 according to the third exemplary embodiment includes a noise amount estimation unit 1301. The noise amount estimation unit 1301 estimates the noise amount in the image data received from the input unit 402.

For example, if the noise in the time direction is not considered, the noise variance representing the noise amount in the image data can be approximately obtained as a variance in a flat part of the image data. The variance is obtained by the following Formula (4):

$$\sigma^2 = \frac{1}{N}\sum_{i=1}^{N}(x_i - \bar{x})^2, \quad (4)$$

where N represents the number of pixels included in an area in which the variance is to be obtained, x represents each pixel value, and $\bar{x}$ represents an average value of the pixel values of the pixels included in the area. In short, Formula (4) is a formula for obtaining the variance of noise with respect to the average value of the pixel values of the pixels in the area.

The noise amount estimation unit 1301 uses Formula (4) to estimate the noise amount in the image data. In the present exemplary embodiment, the matching area for calculating the similarity between the target pixel and the reference pixel is set based on the noise amount estimated in the flat part in the image data to be processed.

Figure 14:
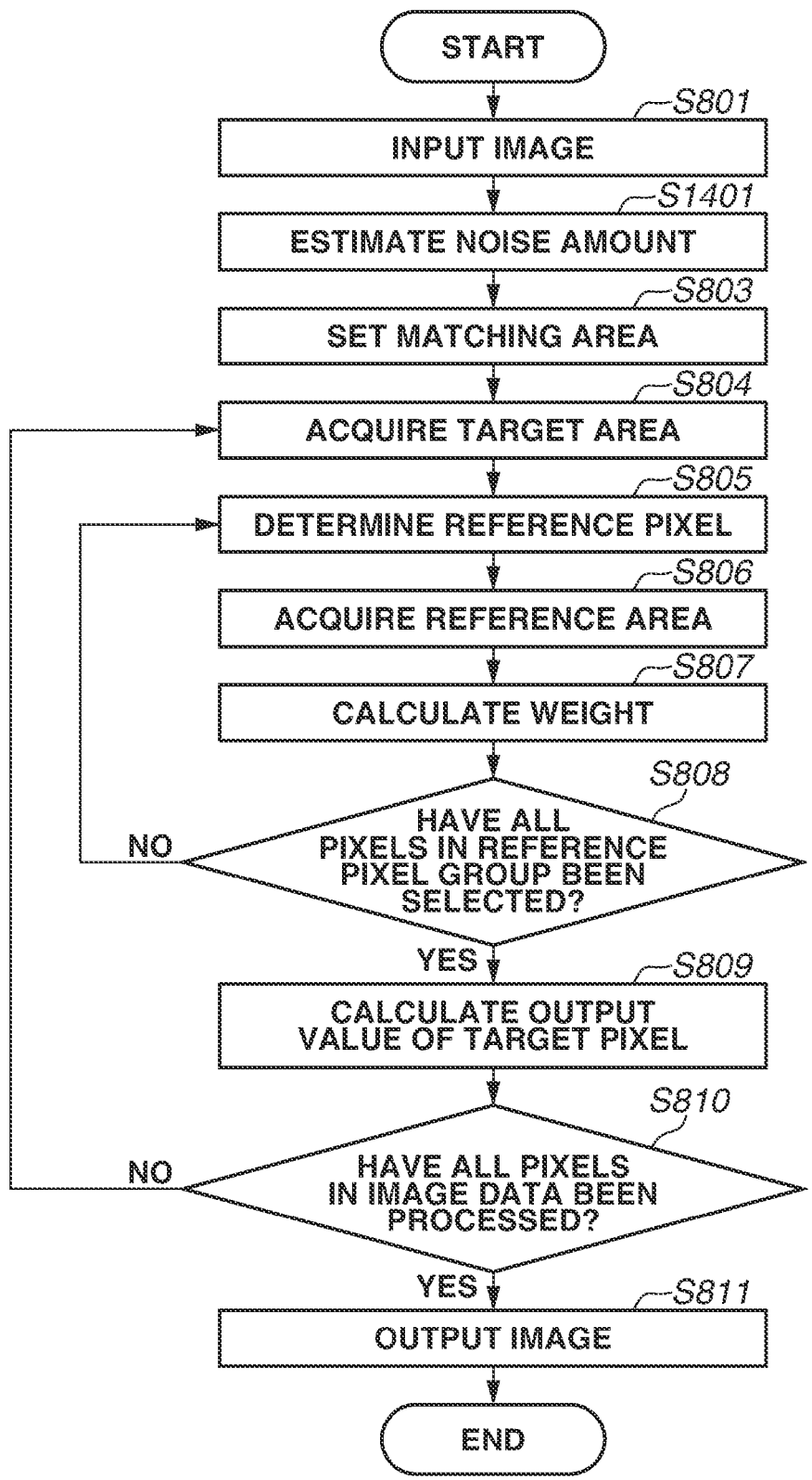
FIG. 14 is a flowchart illustrating processing in the image processing apparatus.

FIG. 14 is a flowchart illustrating processing executed in the image processing apparatus 401 according to the third exemplary embodiment. In step S1401, the noise amount estimation unit 1301 first detects the flat part in the image data. A conventionally known method can be employed to detect the flat part in the image data. The noise amount estimation unit 1301 calculates the estimated noise amount in the detected flat part, by Formula (4).

In step S803, the matching area setting unit 405 sets the matching area according to the estimated noise amount output from the noise amount estimation unit 1301. As an estimated noise amount is larger, the matching area including a larger number of pixels is set. Here, the table may be used as in the first exemplary embodiment, or the matching area may be determined according to the thresholds as in the second exemplary embodiment.

The processing in and after step S804 is similar to that in the first exemplary embodiment. In other words, in the present exemplary embodiment, the similarity is calculated based on the same matching area for all the target pixels in the image data.

According to the third exemplary embodiment described above, the matching area including the number of pixels according to the noise amount estimated from the image data can be set. The imaging condition and the imaging environment of the imaging unit 105 that are used when the image to be processed is captured cannot be always acquired. For example, in a case where the image processing apparatus 401 according to the third exemplary embodiment is a general personal computer (PC), tablet terminal, and the like, the image processing apparatus 401 that executes the noise reduction processing described in the third exemplary embodiment and the imaging unit 105 that generates the image data by imaging are separate apparatuses. In such a case, the imaging information of the image data to be noise-reduced might not be able to be acquired. Thus, by estimating the noise amount from the image data as in the third exemplary embodiment, the matching area including an appropriate number of pixels can be set.

In the exemplary embodiments described above, the matching area is set based on the information related to the noise in the image data, and then the noise reduction processing is executed. In a fourth exemplary embodiment, the description will be given of a method in which noise reduction processes respectively using the matching areas including different numbers of pixels are first executed in parallel, and the result of the noise reduction process using the matching area including a more appropriate number of pixels is determined to be the output value, based on the noise amount in the image data.

Figure 15:
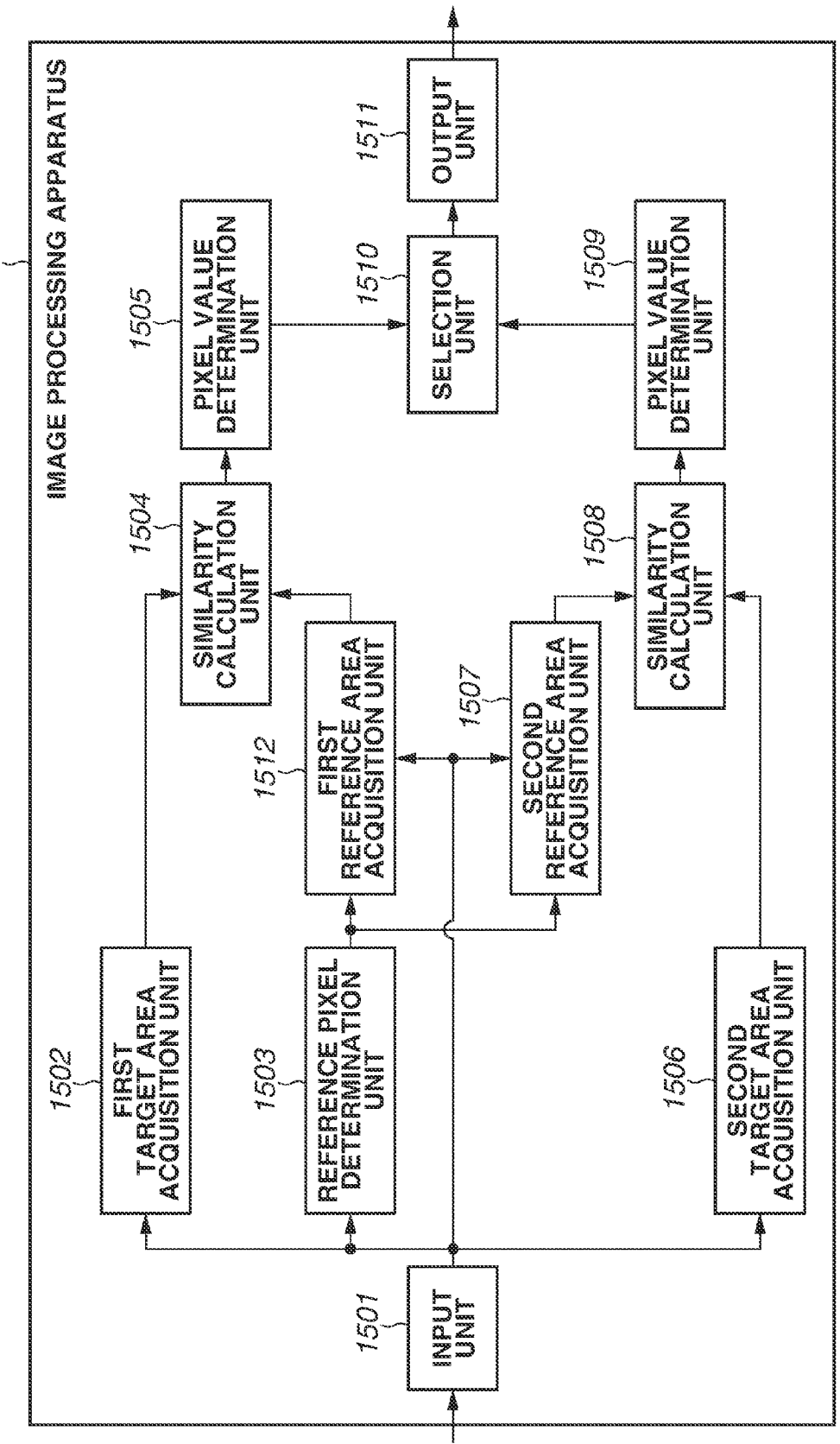
FIG. 15 is a block diagram illustrating a logical configuration of an image processing apparatus.

FIG. 15 is a block diagram illustrating an image processing apparatus 401 according to the fourth exemplary embodiment in detail. An input unit 1501 inputs image data. A first target area acquisition unit 1502 acquires, from the input unit 1501, pixel values in a first target area including a target pixel set in advance. A reference pixel determination unit 1503 determines the reference pixel to be processed, and outputs the reference pixel to a first reference area acquisition unit 1512 and a second reference area acquisition unit 1507. The first reference area acquisition unit 1512 acquires pixel values of the pixels arranged at the corresponding positions in the first target area, for the reference pixel. A similarity calculation unit 1504 calculates the similarity between the target pixel and the reference pixel in the first target area. A pixel value determination unit 1505 determines a first output value of the target pixel from the weight corresponding to the similarity acquired from the similarity calculation unit 1504 and the pixel value of the corresponding reference pixel.

On the other hand, a second target area acquisition unit 1506 acquires pixel values of pixels in a second target area from the input unit 1501. The number of the pixels in the second target area is different from that in the first target area and is set in advance. The second reference area acquisition unit 1507 acquires the pixel values of the pixels arranged at the corresponding positions in the second target area, for the reference pixel. A similarity calculation unit 1508 calculates the similarity between the target pixel and the reference pixel in the second target area. A pixel value determination unit 1509 determines a second output value of the target pixel from the weight corresponding to the similarity acquired from the similarity calculation unit 1508 and the pixel value of the corresponding reference pixel.

The first output value and the second output value are input to a selection unit 1510 from the pixel value determination unit 1505 and the pixel value determination unit 1509, respectively. The selection unit 1510 selects one of the first and the second output values as the output value of the target pixel, based on the information related to the noise in the image data. The selection unit 1510 outputs the selected value to an output unit 1511 as the output value of the target pixel. The output unit 1511 outputs output image data including the output values.

Figure 16:
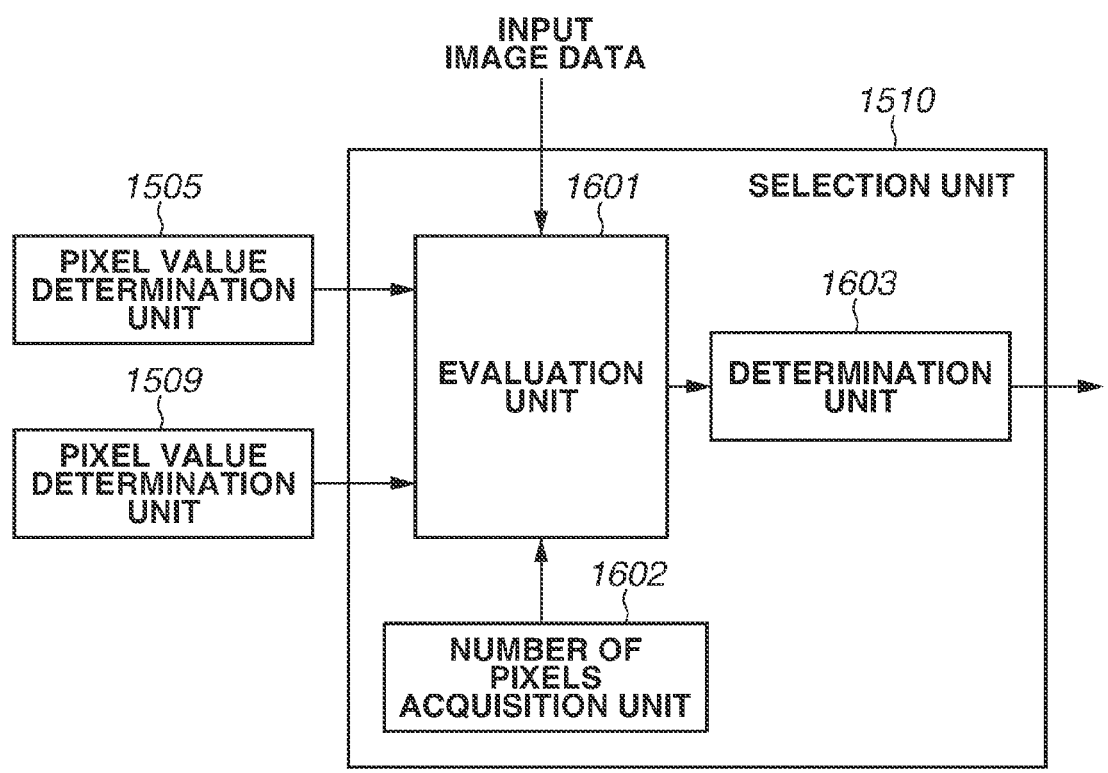
FIG. 16 is a diagram illustrating a detailed configuration of a selection unit.

FIG. 16 is a block diagram illustrating a configuration of the selection unit 1510 in detail. The selection unit 1510 includes an evaluation unit 1601 and a number of pixels acquisition unit 1602, and a determination unit 1603. The number of pixels acquisition unit 1602 acquires the number of pixels included in each of the first and the second target areas. In other words, the number of pixels acquisition unit 1602 acquires the respective numbers of pixels used for calculating the first and the second output values. The evaluation unit 1601 acquires the noise amounts in respective input image data. As described above, the noise amount may be determined based on the imaging condition or the imaging environment that are related to the noise. Alternatively, the noise amount may be determined based on the pixel value for each target pixel, or the noise amount may be estimated from the image data by Formula (4).

Out of the first and the second output values, the determination unit 1603 determines a value which is based on the similarity calculated using a more appropriate number of pixels, based on the noise amounts of the respective image data that are calculated by the evaluation unit 1601.

Figure 17:
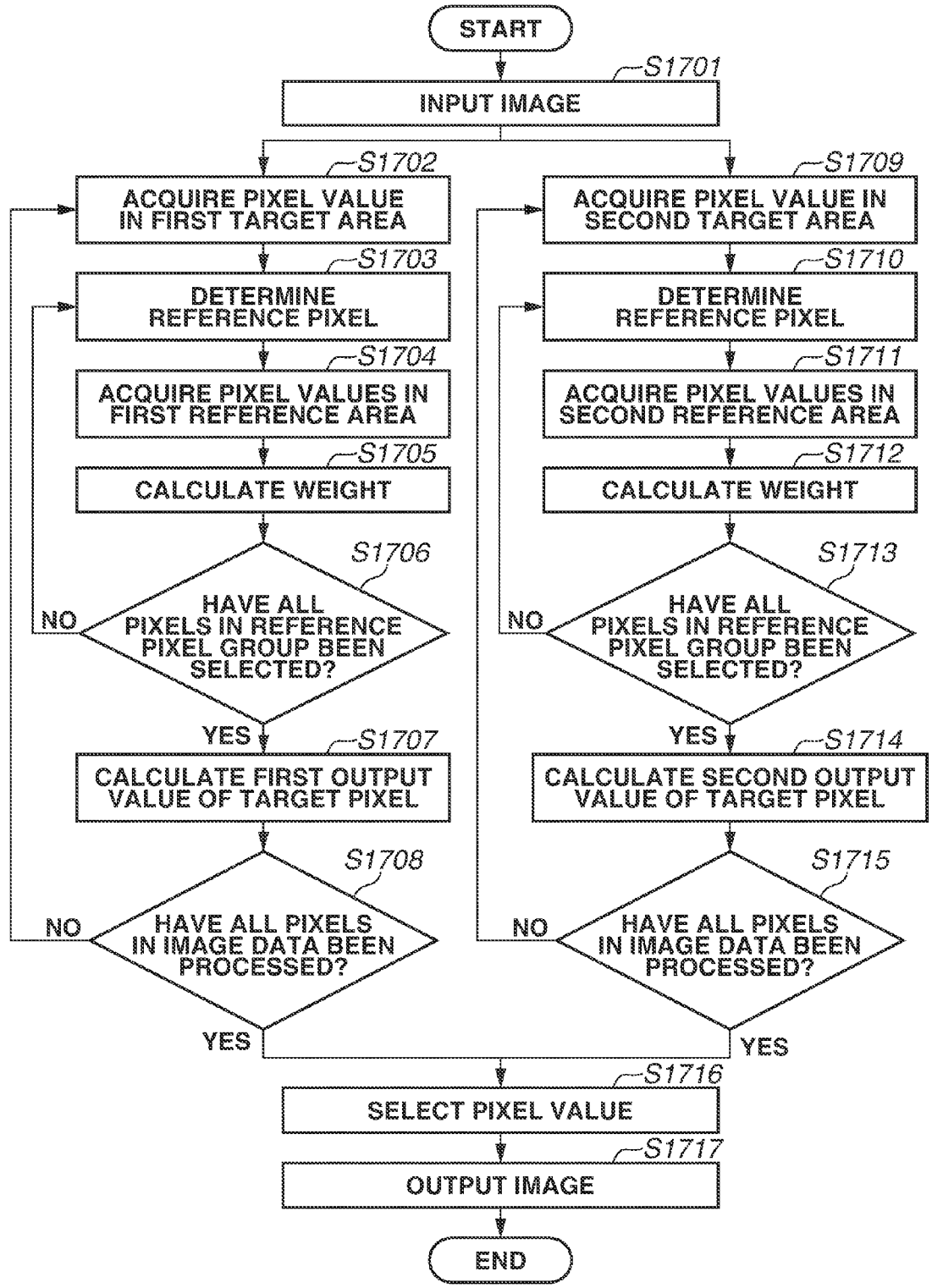
FIG. 17 is a flowchart illustrating processing in the image processing apparatus.

FIG. 17 is a flowchart illustrating processing of the image processing apparatus 401 that is executed by the CPU 101 according to the fourth exemplary embodiment. In the fourth exemplary embodiment, the first target area is the area illustrated in FIG. 6A including nine pixels and the second target area is the area illustrated in FIG. 6B including 25 pixels.

In step S1702, the first target area acquisition unit 1502 acquires the pixel values in the 3×3 rectangular area (the first target area) including the target pixel at the center. In step S1703, the reference pixel determination unit 1503 inputs the reference pixel to be processed. In step S1704, the pixel values in the 3×3 rectangular area including the reference pixel at the center are acquired. In step S1705, the similarity calculation unit 1504 calculates the similarity of the reference pixel to the target pixel based on the differences in pixel value between the corresponding pixels included in the respective 3×3 rectangular areas. In step S1706, it is determined whether all the pixels in the set reference pixel group have been processed as the reference pixel. If the similarity has been calculated for all the reference pixels, the processing proceeds to step S1707. In step S1707, the pixel value determination unit 1505 calculates the first output value through weighted averaging using the pixel values of the reference pixels and the corresponding weights. The first output value is based on the similarity calculated using the pixel values of the corresponding pixels in the respective 3×3 rectangular areas. When the first output values are calculated by setting all the pixels as the target pixels, the processing proceeds from step S1708 to step S1716.

The processing from steps S1709 to S1715 is performed in a similar manner except for the pixel group used for calculating the similarity. As described above, in the processing from steps S1709 to S1715, the similarity is calculated by using the pixel group included in the 5×5 rectangular area (second target area), and the second output value is obtained.

In step S1716, the selection unit 1510 selects one of the output value output from the pixel value determination unit 1505 and the output value output from the pixel value determination unit 1509, for each pixel. For the target pixel, the evaluation unit 1601 evaluates, for each pixel, image data that is noise-reduced using the first target area and output from the pixel value determination unit 1505 and the image data that is noise-reduced using the second target area and output from the pixel value determination unit 1509. In this example, the noise amounts in the respective image data are calculated. The determination unit 1603 determines which of the output value from the pixel value determination unit 1505 and the output value from the pixel value determination unit 1509 is more appropriately noise-reduced, based on the evaluation result of the evaluation unit 1601. In the present exemplary embodiment, as a result of the evaluation executed by the evaluation unit 1601, it is determined that the output value involving a smaller noise amount is to be selected, and the selected output value is output.

When the output values for all the pixels have been determined, in step S1717, the output unit 1511 outputs the output image data.

Figure 18:
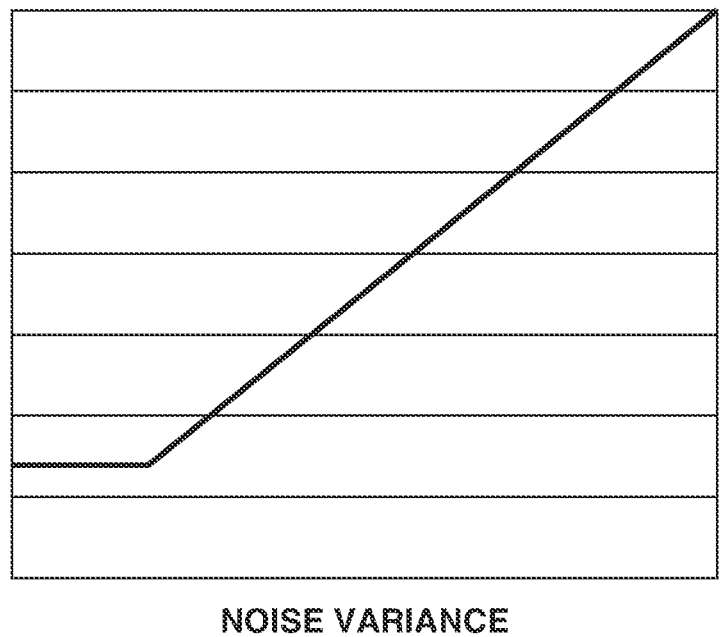
FIG. 18 is a diagram illustrating a relationship between a noise variance and the number of pixels in an area.

In the fourth exemplary embodiment, the selection unit 1510 selects the output value for each pixel, after all the pixels have been processed by the pixel value determination unit 1505 and the pixel value determination unit 1509. However, this should not be construed in a limiting sense. The output value of the target pixel may be selected each time the first and the second output values are respectively acquired from the pixel value determination unit 1505 and the pixel value determination unit 1509. In this case, for example, the noise variance is calculated as an evaluation value of the noise amount for each pixel in input image data to determine an appropriate number of pixels for calculating the similarity for each pixel. The appropriate number of pixels according to the noise variance is determined by storing a table illustrated in FIG. 18. Then, out of the output values from the pixel value determination unit 1505 and the pixel value determination unit 1509, the selection unit 1510 selects an output value obtained as a result of calculating the similarity using the pixel group including a closer number of pixels to the determined number of pixels. In this case, it is sufficient that only the input image data is input to the evaluation unit 1601. At this time, it is sufficient that the outputs from the pixel value determination unit 1505 and the pixel value determination unit 1509 are input to the selection unit 1510.

As described above, the noise reduction processes respectively using the matching areas including different number of pixels are executed in parallel, and one of the resultant output values is selected. As a result, the same effects as in the exemplary embodiments described above can be obtained.

Figure 6E:
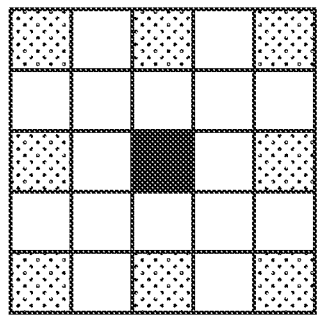
Figure 6F:
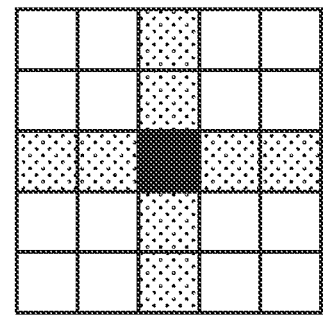

In the exemplary embodiments described above, the rectangular area including the target pixel or the reference pixel at the center is set as the matching area. However, this should not be construed in a limiting sense. For example, as illustrated in FIG. 6E, the similarity between the target pixel and the reference pixel may be calculated by setting a pixel group including a plurality of non-adjacent pixels, as the matching area. Furthermore, as illustrated in FIG. 6F, the pixel group having a cross shape with the target pixel or the target pixel at the center may be set as the matching area.

In the exemplary embodiments described above, the 5×5 pixel area including the target pixel at the center has been described as the reference pixel group of the pixels used for calculating the output value of the target pixel. However, this should not be construed in a limiting sense. All the pixels in the image data may be set as the reference pixel group. Alternatively, a plurality of pixels including no target pixel may be set as the reference pixel group.

Alternatively, a known noise reduction processing other than NLM and the exemplary embodiment described above may be combined and configured to be switchable depending on image data. In this case, the known noise reduction processing and the exemplary embodiment described above can be switched according to, for example, the ISO sensitivity set when the image is captured. Alternatively, the exemplary embodiment described above and noise reduction processing using a fixed number of pixels for block matching in NLM may be switched. In such a case, a calculation load can be reduced by performing the noise reduction processing using a fixed number of pixels for block matching in such a manner that block matching is performed using the minimum number of pixels among pixel group candidates in the above exemplary embodiments.

The present invention may be implemented by supplying a storage medium to a system or an apparatus. The storage medium stores a program code of software for implementing the functions of the exemplary embodiments described above. In this case, a computer (or a CPU or a microprocessor unit (MPU)) of the system or the apparatus reads and executes the program code stored in the computer-readable storage medium, whereby the functions of the exemplary embodiments are implemented.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus to execute noise reduction processing on image data, the image processing apparatus comprising:
    one or more processors; and
    memory storing instructions that, when executed by the one or more processors, cause the one or more processors to function as:
    an acquisition unit configured to acquire a capturing parameter that influences a degree of generation of random noise in the image data,
    a processing unit configured to execute noise reduction processing on the image data, and
    an output unit configured to output noise-reduced output image data based on a result of the processing unit,
    wherein the processing unit determines a weight for a reference pixel based on a reference area including the reference pixel and a target area including a target pixel, and the processing unit calculates a value using reference pixels and weights corresponding to the reference pixels,
    wherein a size of the target area and a size of the reference area are the same, and
    wherein the output unit outputs, as a pixel value of the target pixel on the noise-reduced output image data, according to the capturing parameter, either a first value to be calculated in a case where a first pixel group is set as the target area or a second value to be calculated in a case where a second pixel group different from the first pixel group is set as the target area.

2. The image processing apparatus according to claim 1, wherein the capturing parameter is an International Organization for Standardization (ISO) sensitivity.

3. The image processing apparatus according to claim 2, wherein the processing unit calculates the first value using a parameter indicating the first pixel group for setting the target area and the reference area and calculates the second value using a parameter indicating a second number of pixels larger than a number of pixels included in the first pixel group, and
    wherein the output unit selects, by evaluating the first value according to the ISO sensitivity, either the first value or the second value as the pixel value of the target pixel on the noise reduced output image data.

4. The image processing apparatus according to claim 3, wherein the number of pixels included in the first pixel group is larger than a number of pixels included in the second pixel group, and
    wherein the output unit outputs the first value in a case where the ISO sensitivity is higher than a predetermined threshold.

5. The image processing apparatus according to claim 1, wherein the processing unit sets, based on the capturing parameter, either the first pixel group or the second pixel group as the target area.

6. The image processing apparatus according to claim 1, wherein the capturing parameter is an exposure time.

7. The image processing apparatus according to claim 1, wherein the first pixel group and the second pixel group are rectangular regions.

8. The image processing apparatus according to claim 1, wherein the output unit outputs one of the first value, the second value, and a third value to be calculated in a case where a third pixel group including a number of pixels different from a number of pixels included in the first group and a number of pixels included in the second group is set as the target area.

9. An image processing method for an image processing apparatus to execute noise reduction processing on image data, the image processing method comprising:
    acquiring a capturing parameter that influences a degree of generation of random noise in the image data;
    executing noise reduction processing on the image data; and
    outputting noise-reduced output image data based on a result of executing the noise reduction processing on the image data,
    wherein executing includes determining a weight for a reference pixel based on a reference area including the reference pixel and a target area including a target pixel, and executing includes calculating a value using reference pixels and weights corresponding to the reference pixels,
    wherein a size of the target area and a size of the reference area are the same, and
    wherein outputting includes outputting, as a pixel value of the target pixel on the noise reduced output image data, according to the capturing parameter, either a first value to be calculated in a case where a first pixel group is set as the target area or a second value to be calculated in a case where a second pixel group different from the first pixel group is set as the target area.

10. A non-transitory computer readable storage medium storing a program to cause a computer to perform an image processing method for an image processing apparatus to execute noise reduction processing on image data, the image processing method comprising:
    acquiring a capturing parameter that influences a degree of generation of random noise in the image data;

executing noise reduction processing on the image data; and outputting noise-reduced output image data based on a result of executing the noise reduction processing on the image data, wherein executing includes determining a weight for a reference pixel based on a reference area including the reference pixel and a target area including a target pixel, and executing includes calculating a value using reference pixels and weights corresponding to the reference pixels, wherein a size of the target area and a size of the reference area are the same, and wherein outputting includes outputting, as a pixel value of the target pixel on the noise reduced output image data, according to the capturing parameter, either a first value to be calculated in a case where a first pixel group is set as the target area or a second value to be calculated in a case where a second pixel group different from the first pixel group is set as the target area.

11. The image processing apparatus according to claim 1, wherein the processing unit determines a similarity between the reference area and the target area based on respective pixel values of pixels included in the reference area and the target area and determines the weight corresponding to the similarity.

12. The image processing apparatus according to claim 1, wherein a number of pixels included in the first pixel group is different from a number of pixels included in the second pixel group.

13. The image processing apparatus according to claim 1, wherein the processing unit performs weighted averaging using the reference pixels and the weights of the reference pixels.

14. The image processing apparatus according to claim 1, wherein the processing unit sets pixels in a vicinity of the target pixel as the reference pixels in order from the pixel closest to the target pixel.

\* \* \* \* \*